(12) United States Patent
Shenoy et al.

(10) Patent No.: US 10,185,953 B2
(45) Date of Patent: Jan. 22, 2019

(54) SYSTEM AND METHOD FOR REPORTING A LOST PAYMENT CARD

(71) Applicant: MASTERCARD INTERNATIONAL INCORPORATED, Purchase, NY (US)

(72) Inventors: Kiran Shenoy, O'Fallon, MO (US); Marlowe Valdeabella, Ballwin, MO (US); Mandeep Sandhu, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 88 days.

(21) Appl. No.: 13/774,458

(22) Filed: Feb. 22, 2013

(65) Prior Publication Data
US 2014/0244461 A1 Aug. 28, 2014

(51) Int. Cl.
*G06Q 20/00* (2012.01)
*G06Q 20/34* (2012.01)

(52) U.S. Cl.
CPC .................. *G06Q 20/354* (2013.01)

(58) Field of Classification Search
CPC ........ G06Q 20/32; G06Q 20/40; G06Q 20/04; G06Q 20/3274; G06Q 20/34; G06Q 20/354; G06Q 30/0207; G06Q 30/0269; G06Q 50/24; G06Q 10/1053; G06Q 20/322; G06Q 20/3224; G06Q 20/40145; G06Q 20/42; G06Q 30/02; G06Q 30/0203; G06Q 30/0267; G06Q 40/00; G06Q 50/22
USPC ............................................ 707/705; 705/17
See application file for complete search history.

(56) References Cited

U.S. PATENT DOCUMENTS

| 7,739,169 | B2 * | 6/2010 | Hammad | G06Q 20/04 705/35 |
| 7,832,634 | B1 * | 11/2010 | Bierbaum | G06Q 30/06 235/380 |
| 8,180,704 | B2 * | 5/2012 | McQuaide, Jr. | G06Q 10/10 705/39 |
| 8,499,037 | B2 * | 7/2013 | Rannnani | G06Q 30/02 709/204 |
| 8,793,188 | B2 * | 7/2014 | Larkin | G06Q 20/20 705/35 |

(Continued)

FOREIGN PATENT DOCUMENTS

WO WO-2005086102 A1 * 9/2005 ........... G06Q 20/341

OTHER PUBLICATIONS

Sullivan, Richard J.: The Changing Nature of U.S. Card Payment Fraud: Industry and Public Policy Options, Jun. 25, 2010, pp. 1-35 (Year: 2010).*

(Continued)

*Primary Examiner* — Bijendra K Shrestha
(74) *Attorney, Agent, or Firm* — Ohlandt, Greeley, Ruggiero & Perle, L.L.P.

(57) ABSTRACT

A system and method for registering a payment card so that if the payment card is lost, a replacement payment card can quickly and easily be reported, and shipment of a replacement payment card can be initiated. The location to which the replacement payment card is to be shipped can be specified, and an estimate can be received for its time of arrival at that location. The estimated time of arrival of the replacement card can be updated with real time information.

13 Claims, 2 Drawing Sheets

(56) References Cited

U.S. PATENT DOCUMENTS

| | | | |
|---|---|---|---|
| 8,973,813 B2* | 3/2015 | Penny et al. | 235/375 |
| 2002/0056109 A1* | 5/2002 | Tomsen | G06Q 10/10 |
| | | | 725/60 |
| 2005/0216728 A1* | 9/2005 | Relan | G06Q 20/24 |
| | | | 713/153 |
| 2006/0229911 A1* | 10/2006 | Gropper | G06F 19/321 |
| | | | 705/2 |
| 2007/0028176 A1* | 2/2007 | Perdomo | G06F 21/31 |
| | | | 715/741 |
| 2007/0226086 A1* | 9/2007 | Bauman | G06Q 10/087 |
| | | | 705/28 |
| 2008/0079581 A1* | 4/2008 | Price | G06Q 10/08 |
| | | | 340/572.1 |
| 2008/0103778 A1* | 5/2008 | Kim | H04M 3/493 |
| | | | 704/270.1 |
| 2009/0228384 A1* | 9/2009 | Melik-Aslanian | G06Q 20/342 |
| | | | 705/35 |
| 2010/0094839 A1* | 4/2010 | Brach | G06Q 10/107 |
| | | | 707/705 |
| 2010/0153223 A1* | 6/2010 | Bandyopadhyay | G06Q 10/10 |
| | | | 705/17 |
| 2011/0153437 A1* | 6/2011 | Archer et al. | 705/17 |
| 2012/0185398 A1* | 7/2012 | Weis | G06O 20/20 |
| | | | 705/75 |
| 2013/0054016 A1* | 2/2013 | Canter | G06Q 30/0269 |
| | | | 700/237 |
| 2014/0044303 A1* | 2/2014 | Chakraborti | G06T 7/0002 |
| | | | 382/100 |
| 2014/0057657 A1* | 2/2014 | Manber | G01C 21/3644 |
| | | | 455/456.3 |
| 2014/0171034 A1* | 6/2014 | Aleksin | G06Q 30/016 |
| | | | 455/414.1 |
| 2014/0180959 A1* | 6/2014 | Gillen | G06Q 10/0838 |
| | | | 705/341 |

OTHER PUBLICATIONS

Cornish et al.: Mastercard International Security and Risk Management: Credit Card Fraud, Oct. 17, 2004, pp. 1-28. (Year: 2004).*

Rogak, Lisa: 4 things you must know about emergency credit card replacement, May 27, 2010, pp. 1-9. (Year: 2010).*

* cited by examiner

SYSTEM AND METHOD FOR REPORTING A LOST PAYMENT CARD

BACKGROUND OF THE DISCLOSURE

1. Field of the Disclosure

The present disclosure relates to a lost payment card. More particularly, it relates to a system and method for any individual to quickly and easily report a lost payment card, and request a replacement card.

2. Description of the Related Art

Payment cards, such as credit, debit and prepaid cards, have become very popular for making purchases. One problem associated with payment cards is the possibility of loss of the card, or of a wallet or purse containing several cards. As the number of transactions where a payment card is used has increased, the number of lost cards has also increased.

When a payment card is lost, it is necessary for the consumer that used the card to report the loss to the institution that issued the payment card.

When several cards are lost, several telephone calls must be made. It is difficult for a consumer to store or remember the card number of one payment card. This problem is worse when several cards are lost.

A simple system and/or method for reporting lost or stolen credit cards would be very advantageous to the consumer in protecting against possible losses due to unauthorized use of the payment card. It would provide peace of mind for the consumer and could offer the advantage of faster card replacement. Loss of revenue to the payment card issuer due to fraud or lack of business while the card holder is without a card could be minimized.

SUMMARY OF THE DISCLOSURE

There is provided a system and method for quickly and efficiently reporting the loss of a payment card.

There is also provided a system and method for initiating shipment of a replacement payment card.

There is further provided a system and method for providing an estimate as to when a replacement payment will be received.

The present disclosure provides a computer readable non-transitory storage medium storing instructions of a computer program that when executed by a computer system results in performance of steps for creating and operating the system and the device.

BRIEF DESCRIPTION OF THE DRAWINGS

A component or a feature that is common to more than one figure is indicated with the same reference number in each figure.

DESCRIPTION OF THE PREFERRED EMBODIMENT

Figure 1:
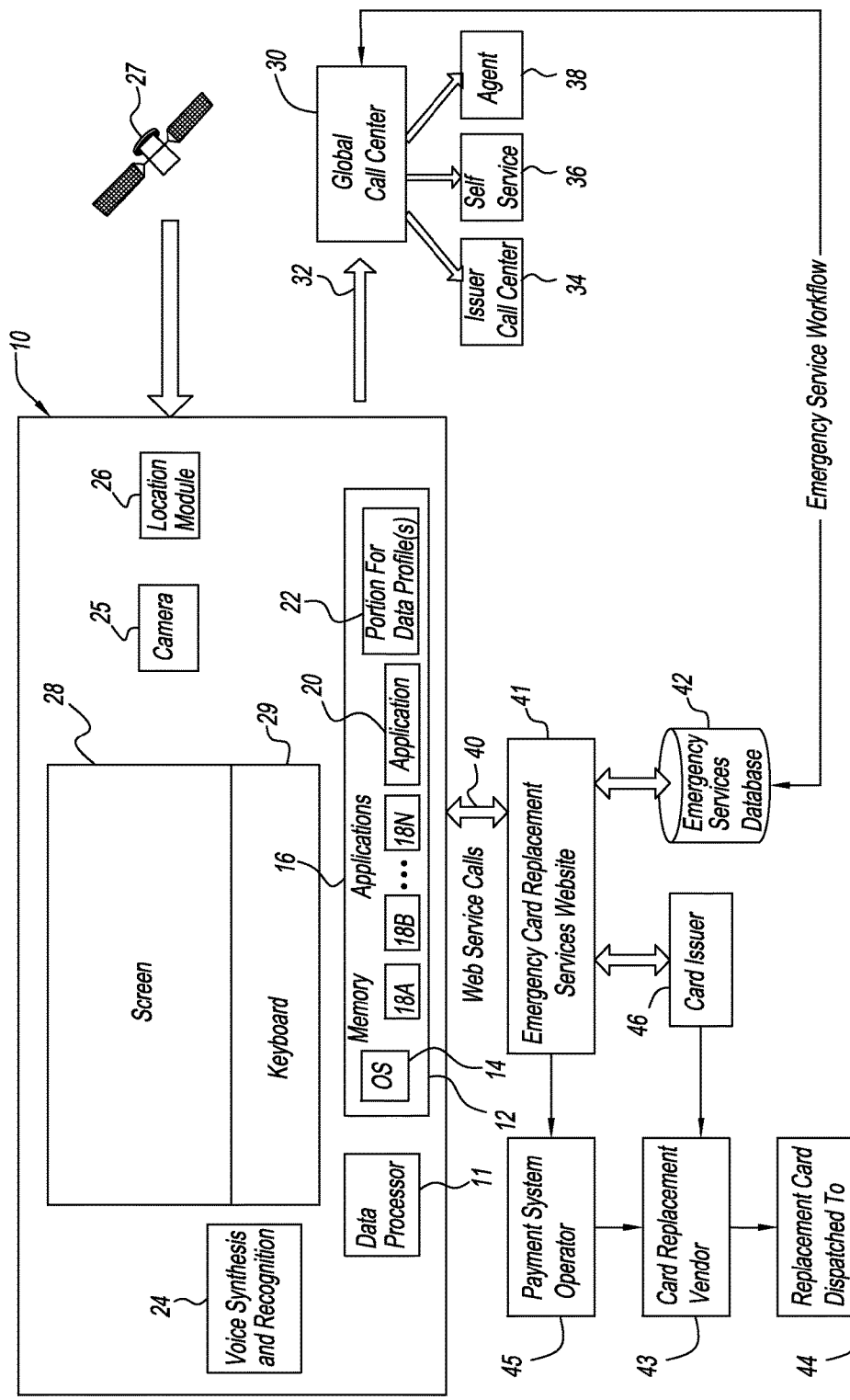
FIG. 1 is block diagram of system for implementing an exemplary embodiment of the present disclosure.

Referring to the drawings and, in particular, FIG. 1, a mobile communication device generally represented by reference numeral 10 is shown. In one embodiment of the present disclosure, communication device 10 is a smart mobile telephone. Communication device 10 has a data processor 11 and a memory 12. Memory 12 stores an operating system (OS) 14 and has a memory portion 16 for storing applications 18A, 18B, . . . 18N. One of these applications 18A, 18B, . . . 18N is a so-called peace of mind application 20 stored in memory portion 16. Memory 12 has a portion 22 for storing one or more payment card profiles, as opposed to one or more credit card numbers.

Communication device 10 includes voice synthesis and recognition services 24. Such voice and recognition services are well known in the art. Communication device 10 also includes a camera 25 for taking digital pictures and a location module 26, which may be a GPS receiver, to receive information from at least one satellite 27. Location module 26 provides information concerning the current location of communication device 10. The current location data may be used to direct telephone calls or Internet communications to the appropriately located call center or web site to facilitate communication. Further features of communication device 10 include a viewing screen 28 and a keyboard 29. Keyboard 29 can have actual keys, in the manner of a smart mobile telephone, or may be a virtual keyboard on screen 28, if screen 28 is configured as a touchscreen.

Communication device 10 can communicate with a global call center 30 via a telephone connection 32 made using standard mobile telephone technology. Call center 30 redirects the call to a payment card issuer call center 34, a self-service call center 36 or an answering agent, represented by 38, depending either on the customer's preference, or the service that is available. Call center 30 has access to an emergency services database 42 to assist in processing calls from communications device 10.

Communication device 10 may also communicate via the Internet, as represented by Internet connection 40. An emergency card replacement (ECR) services web site 41 responds to internet access by communications device 10. Web site 41 has access to emergency services database 42 to assist in processing web based inquiries from communications device 10. As described below, if a payment card has been lost, a card replacement vendor 43 is contacted to dispatch one or more replacement cards to a customer at 44. The manner by which card replacement vendor 43 is notified to dispatch a replacement card is determined by the nature of the lost payment card. If the card was issued by a relatively small issuer that is not responsible for issuing payment cards, web site 41 sends a message to the payment system operator 45. The payment system operator 45 then sends a message to card replacement vendor 43. If card issuer 46 is responsible for issuing a replacement payment card, web site 41 communicates with card issuer 46, and card replacement vendor 43 is notified to dispatch a replacement card.

Call center 30 and web site 41 may be operated by MasterCard, the assignee of the present application. MasterCard operates what is known as a "four-party" open payment card system. The four key participants in a four-party system are: (i) the consumer and business cardholders that use the cards; (ii) the merchants that accept the cards; (iii) the financial institutions that issue the cards (referred to as the card issuer); and (iv) the financial institutions that sign up merchants to accept the cards (referred to as the acquirer).

While access to web site 41 is most conveniently provided by communication device 10 in the form of a mobile telephone, in appropriate circumstances web site 41 may be accessed from a home or business computer, a personal digital assistant, any other Internet connected communication device, such as, a tablet or other mobile device (for example, an iPad® or an Ultrabook), or any stationary device, such as, for example, a kiosk.

Figure 2:
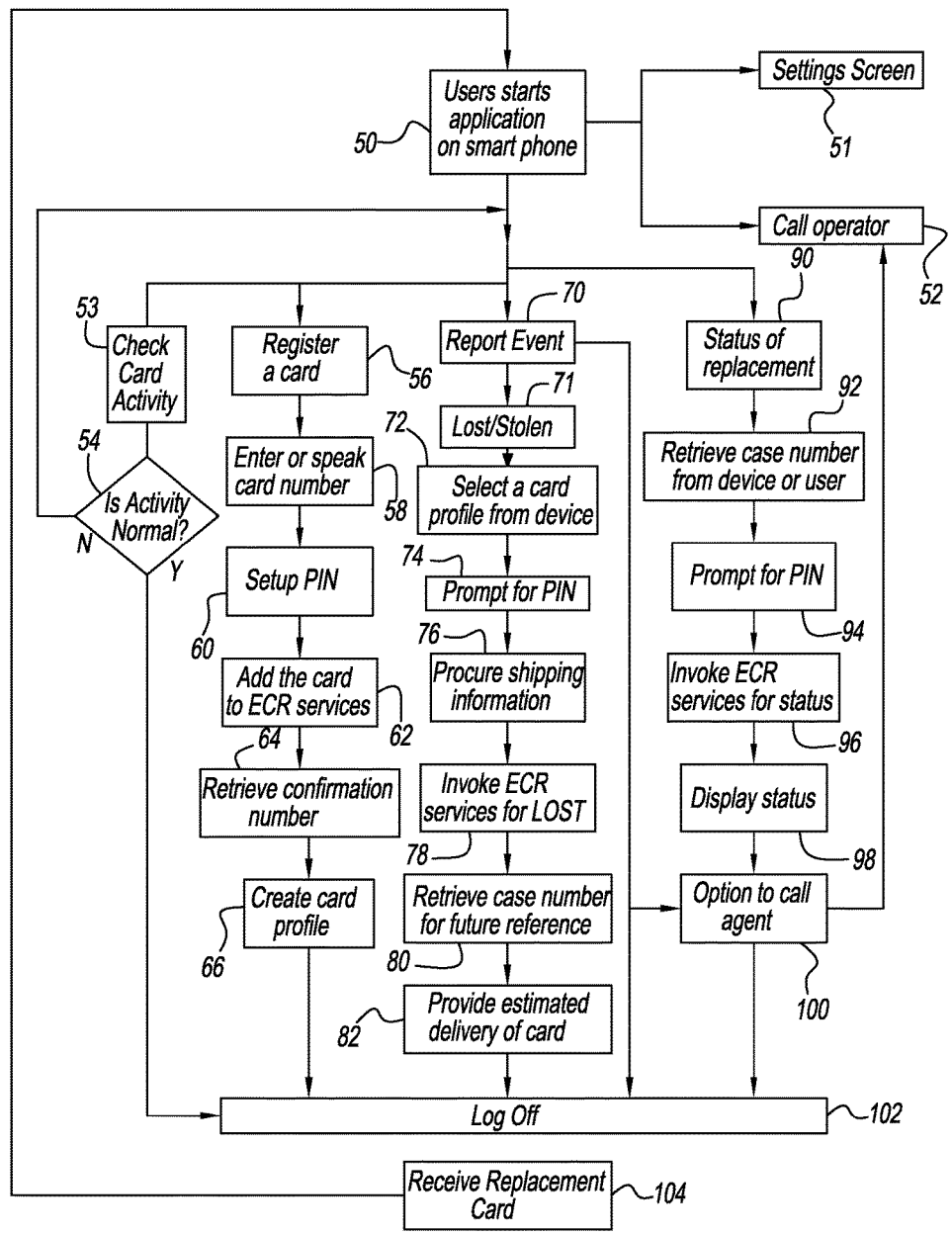
FIG. 2 is a flow chart illustrating the operation of the system of FIG. 1 in accordance the present disclosure.

Referring to FIG. 2, at 50, a customer of the system and method invokes application 20 on communication device 10. The customer is provided with the option on a home screen of calling up a settings screen at 51, so that user customized settings can be applied to application 20, including customer identification information, a password if desired, what functions of application 20 will be utilized, and screen configurations settings, such as size of type. At 52, the customer is provided with the option of calling the operator of the payment card system via the global call center 30 of FIG. 1 for any assistance that the customer requires in setting up application 20, or for other reasons as described below. For example, at 53, the customer can check payment card activity for a payment card that has been registered. At 54, a determination is made, generally by the customer, upon inspection of payment card activity at 53 as to whether the activity is normal. In the case of normal activity, the customer can log off at 102, if nothing else is required. If payment card activity is not normal, then the customer has several options.

Regardless of what has been the payment card activity, or if there has not been activity as, for example, a new card just received by the customer, the registration of a payment card begins at 56. The registration establishes contact with the call center 30 by using a telephone connection 32 or Internet connection 40 as described with respect to FIG. 1. At 58, the card number of the payment card being registered is provided by speaking or entering the number on the keyboard 29 of communication device 10, or by a photograph of the card that shows the card number with camera 25, which photograph is transmitted to web site 41. It is generally quicker, easier and less subject to error to transmit an image than to enter or repeat a number. At 60, a personal identification number (PIN) is set up for the customer. The customer selects this number in a manner similar to that of establishing a password, or may be given the option of the system generating the PIN for the customer. At 62, the payment card being registered is added to the emergency card replacement (ECR) services. At 64, the customer may retrieve or be provided with a transaction confirmation number for future reference. This confirmation number may be securely stored in the payment card profile in memory portion 22 of communication device 10, and may be otherwise secured by the customer, such as by writing it in a convenient place that the customer can access, or by retrieving the profile from memory portion 22.

At 66, the information provided by the customer, and the transaction confirmation number, are utilized to generate a payment card profile that is stored in memory 12 of communication device 10 and in emergency services database 42 of FIG. 1. Additional security for the customer can be provided in that more than just a credit card number and a password may be required in order to invoke ECR services. A requirement may be imposed that the entire profile stored in communication device 10 and in emergency services database 42 must be an exact match for ECR services to be invoked. To provide additional security, an issuer of a payment card will generally have the customer answer one or more personal questions during either a telephone call to or a data exchange with web site 41. Generally, web site 41 will not have the answers to these questions, but forwards the answers supplied by the customer to the card issuer 46, where the answers are authenticated. If the answers are correct, then further transaction processing will continue. If the answers are wrong, transaction processing will not occur until correct answers are provided by the customer. When the registration process is completed, the customer may log off at 102.

The customer may report an event relating to the payment card at 70. An option that the customer may use is to call an agent at 100 to report an event. Such an event, which occurred or is soon to occur, may include, for example a notification by the customer of: 1) unusual payment card activity after a determination of such is made at 54; 2) the customer is traveling and that charges may be coming from a geographic area that is unusual for the customer; 3) that two cards on the same account are used in different geographic areas; 4) that there are successive charges for the same merchant or location; 5) that a particular card is used by a minor and that charges to that payment card are declined after a certain time each evening; or 6) that the payments are declined until a certain date and time, as the payment card may not be in the most secure location for some time (such as in an unattended automobile, while the customer has gone on a fishing trip). When the report of the event has been made, the customer can log of at 102. However, if the event is a lost or stolen payment card, the customer begins reporting at 71. At 72, the profile for the payment card is selected by the customer from a list that is provided on a screen of application 20 on communications device 10. The customer is prompted for the PIN at 74. If the PIN provided is correct, a screen is generated by application 20 for shipping information. This information includes a method of shipment, such as specifying a particular carrier. This information also includes the customer's home address or billing address, which may be specified by a default check off box on the screen, the customer's current address, as entered by the customer, or another address or location where the customer plans to be upon arrival of a replacement payment card, taking into account any shipping time delays. If phone location module 26 of FIG. 1 is active, it may automatically supply the customer's current address, which can be accepted as a location to which the replacement payment card will be shipped.

ECR services are invoked at 78. The card replacement vendor 48 produces a replacement card that is shipped to the customer. A case number for the customer's report is provided at 80. The case number is appended to the payment card profile that is stored in memory 12 of communication device 10 and in emergency services database 42 shown in FIG. 1, and, at the discretion of the customer, otherwise secured by the customer by being written and stored in a secure location. At 82, the customer is provided with an estimate as to when a replacement payment card can be expected. If the time until receipt of the replacement payment card is too long in that the customer will no longer be at the address or location specified at 76, the customer can return through application 20 to the screen at 76 and enter a different address or location. The customer then moves forward through application 20 and reviews a new estimated delivery date. This acts to confirm that the customer will be at the new location when the replacement payment card arrives. These steps can be repeatedly accessed until the customer is comfortable with or reasonably certain of being at a specified location when the replacement payment card arrives. The customer then logs off at 102, after completing these steps or electing to speak to an agent at 100.

At a time after a lost or stolen credit card was reported, a customer uses communication device 10 to again connect to web site 41 for a real time status update 90. At 92, the case number is supplied either from memory 14 of communication device 10, or by the customer on keyboard 29. At 94, the customer is prompted for the customer's PIN. When the correct PIN is provided, at 96, ECR services are invoked for a status check. At 98, the current status of the replacement payment card order is displayed on screen 28 of communication device 10. This current status includes, when available, package tracking information for the current location of the replacement payment card, and estimated time of arrival at the specified address or location. Real time information can be provided.

At 100, the customer has an option of proceeding to 52 to call an agent at global call center 30. The customer will use this if the customer wants to engage services that are not routine, such as, for example, changing a delivery location if still possible, cancelling the delivery of a new payment card, reactivating the card the customer was using should the lost payment card be found, or trying to expedite delivery or other tasks that require the intervention of a human being. When the conversation is completed, the customer logs of at 102.

At 104, the replacement card is received by the customer. The card may be activated in a conventional manner, such as, for example, by calling a telephone number placed on a sticker on the card and answering the questions of a service representative. However, it is preferred for the customer to use the system and method described herein by starting application 20 at step 50, and completing the registration process starting at 56. The profile for the payment card that is replaced will be deleted from portion 22 of memory 12 in device 10, and the profile for the replacement payment card inserted in its place. The payment system must also be updated to have data on which card is active, in order to properly process payments. Thus, registration of a replacement payment card automatically updates this information.

It will be understood that the global call center 30 and the web site 41 serve as a card replacement center if a replacement payment card is needed. In situations, where Internet access is not available but telephone service is available, a telephone call to the global call center may be more efficient. The profile information can be retrieved from the memory of communication device 10 and provided verbally to an operator. In most cases, when Internet service is available, it will be easier to simply use application 20 to report a lost or stolen payment card.

The system and method described herein allows customers to report a lost or stolen payment card and request a replacement card in a quickly and simple manner, with just a few clicks or operations of a simple application on a communication device. The customer need not remember any payment card or call center contact information if the customer chooses not to do so. Registration is secure and easy. Real time delivery estimates for replacement cards are available. The customer can be routed to an appropriate geographic call center and to an agent based on the customer's needs.

The ability to replace a payment card quickly increases consumer confidence. Potential liability of the payment card issuer is reduced, as the customer is more likely to report the loss of a payment card promptly. There is reduced traffic from customers to call centers for lost or stolen payment card. When a consumer receives a replacement card quickly, the consumer resumes making purchases, thus minimizing the loss of sales revenue and fees to the payment card issuer during the time that the customer does not have a payment card.

The services provided by the system and method disclosed herein can be a stand-alone offering, or can be integrated into various financial products, such as, for example, a digital wallet, other electronic payment systems and various mobile offerings such as digital weather, restaurant information and movie information. Fraud alerts and other important information can be sent to customers' communication device 10 from web site 41.

The services provided by the system and method disclosed herein allow the loss of a payment card to be reported with a mobile platform or device. If appropriate, a service charge can be imposed on a monthly or yearly basis for the convenience of use of the system and method disclosed herein. Payment cards are likely to be more popular if this service is available. A customer that uses the system and method disclosed herein will have peace of mind. Payment card issuer that encourage their customers to use this service, rather than issuing replacement payment cards themselves, are likely to reduce their operating costs.

It is also possible for a request for a replacement payment card to be accompanied by a request for an immediate cash advance to be made available to the customer at a location that offers such services close to where the customer is located. This feature can rescue a stranded customer who has no cash or credit cards due to loss of a wallet and mobile telephone by covering expenses until a replacement payment card arrives. The cash may be in the currency in use at the customer's location. An additional fee can be charged for this service.

It will be understood that the present disclosure may be embodied in a computer readable non-transitory storage medium storing instructions of a computer program that when executed by a computer system results in performance of steps of the system or method described herein. Such storage media may include any of those mentioned in the description above.

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A payment card registration and replacement system the system comprising:
   a communication device of a customer having a GPS receiver, a camera, and a processor communicatively connected to a device memory; and
   a web interface configured to access a database of an emergency card replacement service communicatively connected, over a network, to the processor, wherein the database has a database memory,
   wherein the device memory comprises instructions that when executed by the processor, cause the processor to perform the steps of:
   capturing an image of the payment card with the camera of the communication device and deriving the payment card number from the image;

sending the payment card number of the payment card by a transmission from the communication device to the database;

adding the payment card to the emergency card replacement service;

generating a transaction confirmation number of the payment card number;

generating a payment card profile based on the transaction confirmation number;

storing in both the device memory and the database memory, a user profile of the customer based on the payment card number, personal identification number and the transaction confirmation number;

transmitting a report of an event pertaining to the payment card from the communication device of the customer to the emergency card replacement service;

validating the customer by comparing the user profile in the database memory with the user profile in the device memory;

determining if there is an exact match, wherein the emergency card replacement service is configured to require an exact profile match between the profile in the database memory with the user profile in the device memory to invoke a payment card replacement; and obtaining, by the GPS receiver, a location to which a replacement payment card is to be shipped if a payment card is lost.

2. The system of claim 1, wherein the event is at least one event selected from the group consisting of: unusual payment card activity, the customer is traveling so charges may be coming from a geographic area that is unusual for the customer, two cards on the same account are used in different geographic areas, there are successive charges from a single merchant, there are successive charges from a single location, the payment card has been used by a minor, charges to the payment card are to be declined after a certain time each evening, and charges are to be declined until a certain date and time; and wherein the event is acted upon.

3. The system of claim 1, wherein the creating the PIN is based on a user input.

4. The system of claim 3, wherein the instructions further cause the processor to perform the steps:

contacting a payment card replacement center server with a request for a replacement card, if the payment card is lost; and supplying information from the device memory to the payment card replacement center server that confirms identity.

5. The system of claim 4, wherein the instructions further cause the processor to perform the step of:

contacting the payment card replacement center to ascertain status information concerning the replacement payment card.

6. The system of claim 5, wherein the instructions further cause the processor to perform the step of:

initiating a telephone call by the communication device to a human agent for assistance at the card replacement center.

7. The system of claim 3, wherein the instructions further cause the processor to perform the steps of:

determining a location of the device; and selecting a card replacement center to be contacted based on the location of the device.

8. The system of claim 4, wherein the instructions further cause the processor to perform the step of:

receiving, from a payment card replacement center server, an estimate of when the replacement payment card will arrive at the location.

9. A method of registering a payment card, the method comprising:

sending, via a web interface, a payment card number of the payment card by a transmission from a communication device that has a GPS receiver, a camera, a processor, and a device memory to an emergency card replacement service, wherein the payment card number is derived from an image captured by the camera;

creating a personal identification number (PIN) for a customer;

adding the payment card to the emergency card replacement service;

generating a transaction confirmation number of the payment card number;

generating a payment card profile based on the transaction confirmation number;

storing in both the device memory and a database memory of a database an emergency card replacement service that is communicatively connected over a network to the processor, a user profile of the customer based on the payment card number and the personal identification number;

transmitting a report of an event pertaining to the payment card from the communication device of the customer to the emergency card replacement service;

comparing the user profile in the database memory with the user profile in the device memory;

validating the customer by determining if the user profile in the database memory is an exact match with the user profile in the device memory;

obtaining a location with the GPS receiver of the communication device; and transmitting to an emergency card replacement services website the location obtained by the GPS receiver; and wherein a replacement payment card is to be shipped to the location if a payment card is lost.

10. The method of claim 9, further comprising:

wherein the step of sending the payment card number is performed using the payment card number derived from the image.

11. The system of claim 1, wherein the instructions further cause the processor to:

prompt the customer to provide the PIN, receive the PIN prior to transmitting the report, and generating a screen for shipping information if the PIN is correct.

12. The system of claim 1, wherein the event is a lost or stolen payment card.

13. The method of claim 9, wherein the event is a lost or stolen payment card.

* * * * *